UNITED STATES PATENT OFFICE.

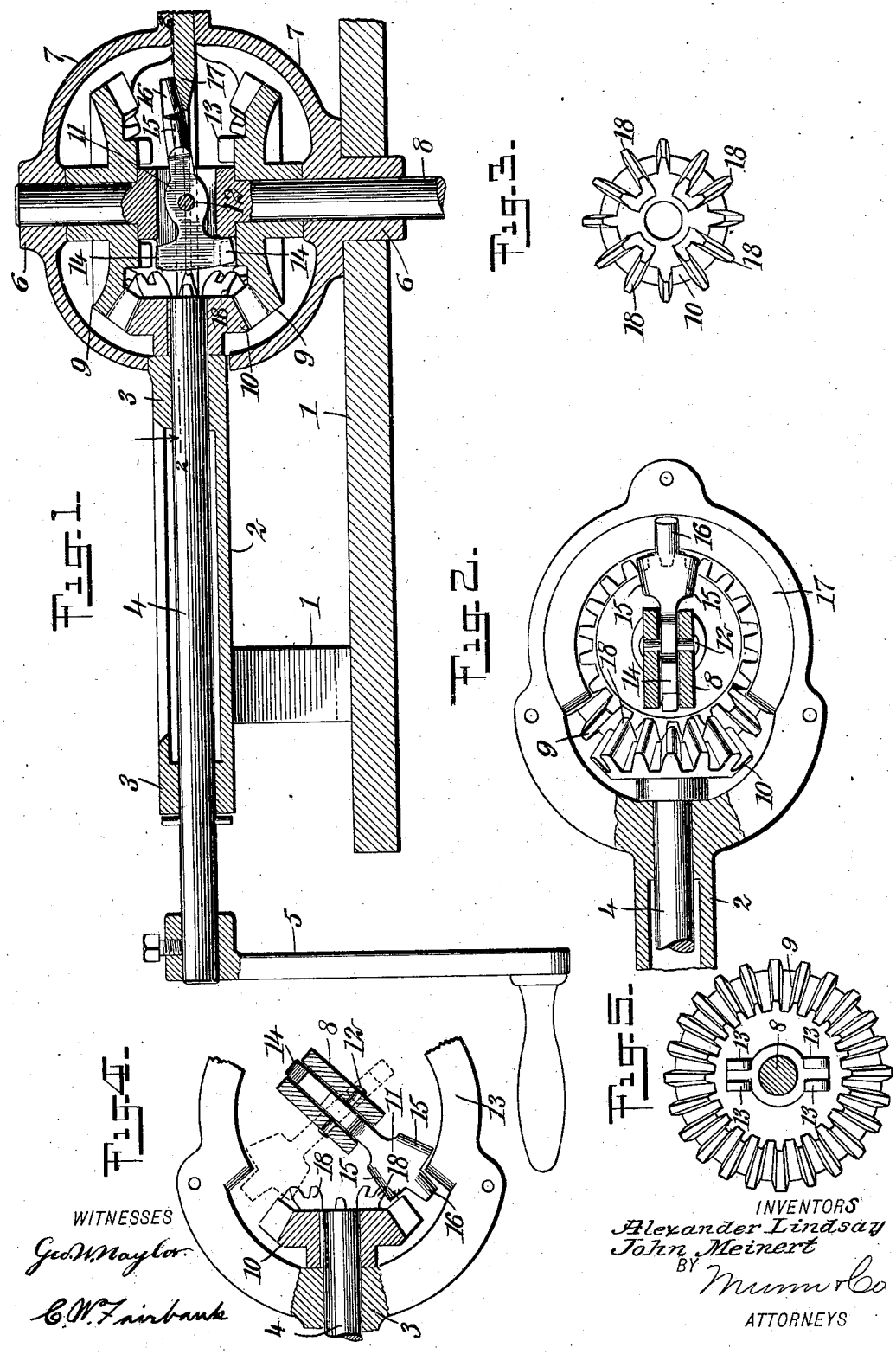

ALEXANDER LINDSAY AND JOHN MEINERT, OF DAVENPORT, IOWA.

MECHANICAL MOVEMENT.

No. 857,408.   Specification of Letters Patent.   Patented June 18, 1907.

Application filed October 13, 1906. Serial No. 338,780.

*To all whom it may concern:*

Be it known that we, ALEXANDER LINDSAY and JOHN MEINERT, both citizens of the United States, and residents of Davenport, in the county of Scott and State of Iowa, have invented a new and Improved Mechanical Movement, of which the following is a full, clear, and exact description.

This invention relates to certain improvements in gearing and more particularly to that class of gearing designed to convert the rotary motion of the power shaft into alternating motion in the driven shaft.

The principal object of the invention is to provide a gearing in which the reversal of the direction of rotation of the driven shaft is accomplished as quickly as possible and with the minimum amount of resistance or friction; the mechanism being very simple and easily operated.

Our improved gearing hereinafter described is particularly designed for washing machines, but it is evident that it may be applied to any device or machine in which it is desired to impart an alternating motion to a driven shaft.

Reference is to be had to the accompanying drawings forming a part of this specification, in which similar characters of reference indicate corresponding parts in all the figures, in which Figure 1 is a central longitudinal section through one form of our improved gearing; Fig. 2 is a section at right angles thereto, and on the line 2—2 of Fig. 1; Fig. 3 is a front elevation of the gear wheel carried by the power shaft; Fig. 4 is a view similar to Fig. 2, but showing the mechanism in the act of reversing; and Fig. 5 is a plan view of one of the reversing gear wheels.

In the specific form of our invention which we have illustrated in the drawings, we employ a suitable frame 1, carrying a hollow support 2, having journal boxes 3 at its ends for supporting the power shaft 4. This power shaft may be operated in any suitable manner or connected to any suitable device for creating rotary motion. In the drawings we have illustrated the power shaft as being provided with a simple crank 5, whereby it may be rotated.

Supported within bearings 6 at the opposite sides of a hollow protecting casing 7, is the shaft 8 which it is desired to give an alternating motion. This shaft has loosely mounted thereon two bevel gear wheels 9, which mesh with a bevel gear wheel 10, rigidly secured to the end of the power shaft 4. Upon rotating the power shaft, the two gear wheels 9 will be rotated in opposite directions upon the shaft 8, and our invention resides more particularly in the means employed for alternately locking the shaft 8 to each of the two bevel gear wheels 9. For accomplishing this result we provide the portion of the shaft 8 between the two bevel gears 9, with an enlarged portion bearing against the inner surface of said gear wheels to hold them in position, and secure a locking lever 11 to the shaft 8 by a pivot pin 12 extending across an opening cut through the center of the shaft. Each of the two gear wheels 9 is provided with pairs of lugs 13, projecting from the inner surface thereof at opposite sides of the center, and the end of the locking lever 11 is provided at one end with two wings or projections 14, which when the end of the lever is in one position will engage between one pair of lugs on one of the bevel gears 9, and when in the opposite position will engage with one pair of the lugs on the opposite bevel gear 9. For automatically and intermittently reversing the lever to bring it alternately into engagement with the two bevel gears 9 and for positively locking the lever in position when it is in engagement with the lugs of either bevel gear 9, we provide the end of the lever with two projections or teeth 15 similar to the teeth on the bevel gears, and projecting in opposite directions from the lever and at right angles to the projections or wings 14. The end 16 of the lever beyond the teeth 15 is adapted to travel either above or below a guide 17, and may, if desired, be provided with a roller to reduce the friction. The guide extends around parallel to the circumference of the two bevel gears 9 and intermediate thereof, and terminates at points a short distance from the opposite sides of the bevel gear wheel 10. The distance between the ends of the guide and the surface of the bevel gear 10 is sufficient so that the end 16 of the lever may pass between the end of the guide and the bevel gear 10, when either one of the teeth 15 of the lever comes into engagement with the said bevel gear. For facilitating this engagement of the teeth 15 with said gear wheel, we preferably extend certain of the teeth beyond the point necessary for the engagement with the bevel gears 9, so that as the lever 11 is moved around with the shaft 8, the teeth 15 may come in engagement with the prolonged inner ends of these longer teeth 18 of the bevel gear 10, and move the lever on its pivot pin 12 to disengage one of the wings 14 on the opposite end of the lever from engagement with the lugs of one of the bevel gears 9 and force the opposite wing 14 into engagement with the lugs 13 of the opposite gear wheel.

In the operation of our improved mechanical movement, the shaft 4 is continuously rotated in the same direction and the two gear wheels 9 are continuously rotated in opposite directions by reason of their engagement with the bevel gear 10. Assuming the locking lever 11 to be in the position shown in Fig. 1, the end 16 rides upon the upper surface of the guide 17 and holds one of the wings 14 of the lever into engagement with the lugs on one of the bevel gears 9. When in this position, the shaft 8 is locked to this bevel gear wheel 9 and is rotated therewith in one direction. As the shaft 8 reaches the position shown in Fig. 4, the end 16 of the lever passes the end of the guide 17 and the lever is unlocked, so that it may freely turn on the pivot pin 12. At this time one of the teeth 15 of the lever comes into engagement with the inner end of one of the elongated teeth 18, and the lever is moved upon its pivot pin to bring the wing 14 out of engagement with the lugs on one of the gear wheels 9 and bring the opposite wing into engagement with the lugs on the opposite gear wheel 9. As soon as the last mentioned engagement is perfected, the shaft immediately starts in the reverse direction and brings the tooth 15 out of engagement with the bevel gear 10 and the end 16 passes along the guide 17 on the opposite side thereof. As the lever and shaft reach the position shown in dotted lines in Fig. 4, the other tooth 15 of the lever comes into engagement with the opposite side of the bevel gear 10 and is forced in the opposite direction to again reverse the position of the lever 11 and the direction of rotation of the shaft 8. Thus, as the power shaft 4 is continuously rotated in one direction, the driven shaft 8 will be rotated through three-fourths of a revolution in one direction, and then through three-fourths of a revolution in the opposite direction, the change in the direction of rotation being accomplished almost instantaneously and with the minimum amount of resistance. When the shaft 8 is rotated in the one direction, the means for locking it to the bevel gear 9 cannot possibly become accidentally disengaged or the shaft freed from its locked position. The unlocking does not occur until the instant that it is desired to shift the position of the lever 11, and as soon as the shaft is unlocked the teeth 15 of the lever instantly engage with the bevel gear 10 and the position of the lever is shifted and it is locked in its opposite position.

It will be noted that it is entirely immaterial in which direction the power shaft 4 is rotated, as the effect upon the shaft 8 would be the same in either case, the change in the direction of the rotation of the shaft 4 having no effect whatever upon the alternating motion of the shaft 8. It is further obvious that in case the source of power was some form of power in which an alternating motion was produced, the shaft 8 might be connected directly to the motor and constitute the power shaft and the shaft 4 would then be rotated continuously and used to convey power to any mechanism desired.

Having thus described our invention, we claim as new and desire to secure by Letters Patent:

1. In combination, a power shaft, a gear wheel secured thereto, a driven shaft, two gear wheels loosely mounted thereon and adapted to engage with the first mentioned gear wheel, and a member pivoted to said driven shaft intermediate the gear wheels thereon and having one end adapted to engage alternately with each of said last mentioned gear wheels and having the other end adapted to engage with the teeth of the first mentioned gear wheel for reversing the position of the member.

2. In combination, a power shaft, a gear wheel secured thereto, a driven shaft, two gear wheels loosely mounted on said driven shaft and adapted to engage with the first mentioned gear wheel, a lever pivoted to said driven shaft intermediate the gear wheels thereon and adapted to engage alternately with each of said gear wheels, and said lever having teeth adapted to engage with the first mentioned gear wheel for reversing the position of the lever.

3. In combination, a power shaft a bevel gear wheel secured thereto, a driven shaft two bevel gear wheels loosely mounted thereon and in engagement with the first mentioned gear wheel, a lever pivoted to the driven shaft intermediate said gear wheels, each of said loosely mounted gear wheels having lugs on their inner surfaces and adapted to engage alternately with one end of the pivoted lever, said lever having teeth on the opposite end thereof adapted to engage with the gear wheel of the power shaft for reversing the position of the lever, and a guide for continuously holding the lever in the desired position, save when its position is being reversed by the action of the power shaft gear wheel.

4. In combination, a power shaft, a bevel gear wheel mounted thereon, a driven shaft, bevel gear wheels loosely mounted thereon and adapted to engage with the first mentioned gear wheel, a lever pivotally connected to said driven shaft intermediate the loosely-mounted gear wheels, said lever having wings on one end, and each of said loosely mounted gear wheels having projections on the inner surface adapted to engage with the wings on said lever, said lever having teeth on the opposite end thereof adapted to engage with the teeth of the power shaft gear wheel, and a guide terminating adjacent the power shaft gear wheel, for locking the lever in the desired position.

In testimony whereof we have signed our names to this specification in the presence of two subscribing witnesses.

ALEXANDER LINDSAY.
   JOHN MEINERT.

Witnesses:
 Wm. Brehmer,
 Victor Kieffert, Jr.